US008523426B2

(12) United States Patent
Bühler et al.

(10) Patent No.: US 8,523,426 B2

(45) Date of Patent: Sep. 3, 2013

(54) ONE-PIECE REGULATING MEMBER AND METHOD OF MANUFACTURING THE SAME

(75) Inventors: Pierre-André Bühler, Orvin (CH); Marco Verardo, Les Bois (CH); Thierry Conus, Lengnau (CH); Jean-Philippe Thiebaud, Cudrefin (CH); Jean-Bernard Peters, Pieterlen (CH); Pierre Cusin, Villars-Burquin (CH)

(73) Assignee: Nivarox-FAR S.A., Le Locle (CH)

( * ) Notice: Subject to any disclaimer, the term of this patent is extended or adjusted under 35 U.S.C. 154(b) by 362 days.

(21) Appl. No.: 12/933,528

(22) PCT Filed: Mar. 13, 2009

(86) PCT No.: PCT/EP2009/053000
§ 371 (c)(1),
(2), (4) Date: Dec. 13, 2010

(87) PCT Pub. No.: WO2009/115463
PCT Pub. Date: Sep. 24, 2009

(65) Prior Publication Data

US 2011/0103197 A1 May 5, 2011

(30) Foreign Application Priority Data

Mar. 20, 2008 (EP) .................................... 08153101

(51) Int. Cl.

| | |
|---|---|
| ***G04B 15/00*** | (2006.01) |
| ***G04B 17/04*** | (2006.01) |
| ***C23F 1/00*** | (2006.01) |
| ***C25F 3/00*** | (2006.01) |
| ***F16F 1/06*** | (2006.01) |

(52) U.S. Cl.
USPC ............... 368/127; 368/169; 368/177; 216/2; 216/99

(58) Field of Classification Search
USPC ............. 368/124, 127, 169, 175, 177; 216/2, 216/99; 267/154–156
See application file for complete search history.

(56) References Cited

U.S. PATENT DOCUMENTS

| | | | |
|---|---|---|---|
| 322,093 | A | 7/1885 | Davies |
| 1,859,866 | A | 5/1932 | Dubois |

(Continued)

FOREIGN PATENT DOCUMENTS

| | | | |
|---|---|---|---|
| CH | 60 577 | A | 8/1913 |
| CH | 332 885 | A | 9/1958 |

(Continued)

OTHER PUBLICATIONS

International Search Report issued in corresponding application No. PCT/EP2009/053000, completed Jun. 29, 2009 and mailed Jul. 3, 2009.

(Continued)

*Primary Examiner* — Vit W Miska
(74) *Attorney, Agent, or Firm* — Griffin & Szipl, P.C.

(57) ABSTRACT

The invention relates to a one-piece regulating member including a balance cooperating with a hairspring made in a layer of silicon-based material and including a balance spring coaxially mounted on a collet. According to the invention, the collet includes one extending part that projects from the balance spring and which is made in a second layer of silicon-based material and is secured to the balance.

23 Claims, 7 Drawing Sheets

(56) References Cited

U.S. PATENT DOCUMENTS

| | | | | |
|---|---|---|---|---|
| 3,161,012 | A | 12/1964 | Hug et al. | |
| 6,354,731 | B1 | 3/2002 | Halter | |
| 8,240,910 | B2 * | 8/2012 | Orny et al. | 368/169 |
| 2003/0179655 | A1 | 9/2003 | Scheufele | |
| 2006/0055097 | A1 * | 3/2006 | Conus et al. | 267/273 |
| 2007/0140065 | A1 | 6/2007 | Levingston | |
| 2008/0037376 | A1 * | 2/2008 | Lippuner et al. | 368/139 |
| 2010/0054090 | A1 * | 3/2010 | Orny et al. | 368/175 |
| 2012/0320718 | A1 * | 12/2012 | Buhler et al. | 368/177 |

FOREIGN PATENT DOCUMENTS

| | | | |
|---|---|---|---|
| EP | 0 732 635 | A1 | 9/1996 |
| EP | 1 422 436 | A1 | 5/2004 |
| EP | 1 431 844 | A1 | 6/2004 |
| EP | 1 584 994 | A1 | 10/2005 |
| EP | 1 612 627 | A1 | 1/2006 |
| EP | 1 655 642 | A2 | 5/2006 |
| EP | 1 837 722 | A1 | 9/2007 |
| FR | 1 301 938 | A | 8/1962 |
| GB | 1 083 209 | A | 9/1967 |
| GB | 2 416 408 | A | 1/2006 |

OTHER PUBLICATIONS

Notice of Allowance issued co-pending related U.S Appl. No. 12/933,538 on Jun. 5, 2013

* cited by examiner

ONE-PIECE REGULATING MEMBER AND METHOD OF MANUFACTURING THE SAME

This is a National Phase Application in the United States of America of International Patent Application PCT/EP2009/053000 filed Mar. 13, 2009, which claims priority on European Patent Application No. 08153101.4 of Mar. 20, 2008. The entire disclosures of the above patent applications are hereby incorporated by reference.

FIELD OF THE INVENTION

The invention concerns a regulating member and the method of manufacturing the same and, more specifically, a sprung balance type regulating member.

BACKGROUND OF THE INVENTION

The regulating member of a timepiece generally includes an inertia wheel, called a balance, and a resonator called a balance spring. These parts have a determining role as regards the working quality of the timepiece. Indeed, they regulate the movement, i.e. they control the frequency of the movement.

The balance and the balance spring are different in nature, which makes it extremely complex to manufacture the regulating member, the manufacturing including the manufacture of the balance and the balance spring and the resonant assembly of the two parts.

The balance and the balance spring have thus each been manufactured in different materials, particularly in order to limit the influence of a temperature change, but without resolving the difficulties as regards resonant assembly.

SUMMARY OF THE INVENTION

It is an object of the present invention to overcome all or part of the aforecited drawbacks by proposing a one-piece regulating member, which remains insensitive to temperature changes and which is obtained via a manufacturing method that minimises assembly difficulties.

The invention thus relates to a one-piece regulating member that includes a balance cooperating with a hairspring, made in a layer of silicon-based material and including a balance spring coaxially mounted on a collet, the collet including one extending part that projects from the balance spring and which is made in a second layer of silicon-based material, characterized in that the extending part of the hairspring collet is secured to the balance.

According to other advantageous feature of the invention:

- the balance has a hole that extends the inner diameter of the collet so as to receive a balance staff therein;
- the balance staff is secured to the balance;
- the balance staff is secured to the balance by being driven against a metal coating made in the hole;
- the section of the inner diameter of the collet is larger than that of the hole in the balance to prevent push fit contact between the balance staff and the inner diameter of the collet;
- the balance felloe is continuous and includes an adapting device that can alter the moment of inertia of the balance;
- the felloe is connected to the balance hub by at least one arm, which is slim so as to allow it to deform axially and/or radially in the event that any shock is transmitted to the balance;
- the adapting device includes recesses made on the balance felloe so that the inertia of the balance can be adjusted;

- the recesses include a material of much greater density than that of the balance felloe so as to increase the inertia of the balance;
- the adapting device includes bosses made on the balance staff and including a material of much greater density than the felloe so as to increase the inertia of the balance;
- the balance is made in a third layer of silicon-based material;
- the material of much greater density is distributed on the felloe in the form of a notched ring including a series of studs spaced at regular intervals to compensate for any thermal expansion of the material;
- the inner coil of the balance spring has a Grossmann type curve to improve the concentric development of the balance spring;
- the balance spring includes at least one silicon dioxide based part to make it more mechanically resistant and to adjust its thermo-elastic coefficient.

More generally, the invention also relates to a timepiece, characterized in that it includes a one-piece regulating member according to any of the preceding variants.

Finally, the invention relates to a method of manufacturing a regulating member including the following steps:

a) providing a substrate that includes a top layer and a bottom layer made of silicon-based materials;
b) selectively etching at least one cavity in the top layer to define the pattern of a first part of a collet and of a first part of a balance made of silicon-based material of the member;
c) securing an additional layer of silicon-based material to the top, etched layer of the substrate;
d) selectively etching at least one cavity in the additional layer to continue the pattern of the first parts of the collet and balance, and to define the pattern of a balance spring made of silicon-based material of the member;

characterized in that it further includes the following steps:

e) selectively etching at least one cavity in the bottom layer to define the last part of the silicon-based balance of the member;
f) releasing the regulating member from the substrate, which provides a member across three levels of silicon-based material.

In accordance with other advantageous features of the invention:

- after step d), step g) is performed: the second part of the member made of silicon-based material is oxidised so as to adjust its thermo-elastic coefficient but also to make it more mechanically resistant,
- prior to step e), step h) is performed: at least one layer of metal is selectively deposited on the bottom layer to define the pattern of at least one metal part of the member and/or a second metallic part for receiving an arbour that is driven therein;
- step h) includes step i): growing the deposition by successive metallic layers at least partially on the surface of the bottom layer so as to form a metallic part for increasing the mass of the balance made of silicon-based material and/or a second metallic part for receiving an arbour that is driven therein;
- step h) includes step j): selectively etching at least one cavity in the bottom layer for receiving the at least one metal part and step k): growing the deposition by successive metal layers at least partially in the at least one cavity so as to form a metal part for increasing the mass of the balance made of silicon-based material and/or a second metal part into which an arbour will be driven,
- step h) includes the last step i): polishing the metal deposition, several members are made on the same substrate, which allows batch manufacture.

Thus, in accordance with a first non-limiting illustrative embodiment of the present invention, a one-piece regulating member (41, 41', 41") is provided that includes a balance (43, 43', 43") cooperating with a hairspring (51, 51', 51") made in a layer of silicon-based material (21) and including a balance spring (53, 53', 53") coaxially mounted on a collet, characterized in that the collet (55, 55', 55") includes one extending part (19) that projects from the balance spring and which is made in a second layer of silicon-based material (5) and is secured to the balance (43, 43', 43"). In accordance with a second non-limiting illustrative embodiment of the resent invention the first non-limiting embodiment is modified so that the balance (43, 43', 43") includes a hole (26) that extends the inner diameter (24, 10) of the collet (55, 55', 55") so as to receive a balance staff (49) In accordance with a third non-limiting illustrative embodiment of the present invention, the second non-limiting embodiment is further modified so that the balance staff (49) is secured to the balance (43, 43', 43"). In accordance with a fourth non-limiting illustrative embodiment of the present invention the third non-limitins embodiment is further modified so that the balance staff (49) is secured to the balance (43", 43') by being driven against a metal coating (63, 66) made in the hole.

In accordance with a fifth non-limiting embodiment of the present invention the second third and fourth non-limitin embodiments are further modified so that the section of the inner diameter (24, 10) of the collet (55, 55', 55") is larger than that of the hole (26, 63, 66) of the balance (43, 43', 43") to prevent push fit contact between the balance staff (49) and the inner diameter (24, 10) of the collet (55, 55', 55"). In accordance with a sixth non-limiting illustrative embodiment of the present invention, the first, second, third, fourth and fifth non-limiting. embodiments are further modified so that the felloe (47, 47', 47") of the balance (43, 43', 43") is continuous and includes an adapting, device (61, 64, 68) that can alter the moment of inertia of the balance. In accordance with a seventh non-limiting illustrative embodiment of the present invention, the sixth non-limiting embodiment is further modified so that the felloe (47, 47', 47") is connected to the hub (45, 45', 45") of the balance (43, 43', 43") by at least one arm (40, 42 44, 46, 40', 42', 44', 46', 40", 42", 44", 46"), which is slim to allow the axial and/or radial deformation thereof in the event of any shock transmitted to the balance (41, 41', 41"). In accordance with an eighth non-limiting illustrative embodiment of the present invention, the sixth and seventh non-limiting embodiments are further modified so that the adaptation device includes recesses (60, 68) made on the felloe (47, 47") of the balance (43, 43") so as to adjust the inertia of the balance. In accordance with an ninth non-limiting illustrative embodiment of the present invention, the eighth non-limiting embodiment is further modified so that the recesses (60) include a material of eater densit, than that of the felloe (47") of the balance (43") so as to increase the inertia of the balance. In accordance with a tenth non-illustrative embodiment of the resent invention, the sixth and seventh non-limiting embodiments are further modified so that the adaptation device includes bosses (61) made on the felloe (47') of the balance (43') and includes a material of greater density than the felloe (4') so as to increase the inertia of the balance. In accordance with an eleventh non-limiting illustrative embodiment of the present invention the ninth and tenth non-limiting embodiments are further modified so that the material of larger density is distributed on the felloe (47', 47") in the form of a notched ring (61, 64) including a series of studs (65, 69) spaced at regular intervals to compensate for any thermal expansion of the material.

In accordance with a twelfth non-limiting illustrative embodiment of the present invention, the first, second, third, fourth, fifth, sixth, seventh, eighth, ninth, tenth and eleventh non-limiting embodiments are further modified so that the balance 43, 43', 43") is made in a third layer (7) of silicon-based material. In accordance wfth a thirteenth non-limiting illustrative embodiment of the present invention, the first, second, third, fourth, fifth, sixth, seventh, eighth, ninth, tenth, eleventh and twelfth non-limiting embodiments are further modified so that the inner coil of the balance spring (53, 53', 53") has a Grossmann curve to improve the concentric development of the balance spring. In accordance with a fourteenth non-limiting illustrative embodiment of the present invention, the first, second, third, fourth, fifth, sixth, seventh, eighth, ninth, tenth, eleventh , twelfth and thirteenth non-limiting embodiments are further modified so that the balance spring (53, 53', 53") has at least one silicon-dioxide based part to make the balance spring more mechanically resistant and to adjust the thermo-elastic coefficient thereof. In accordance with a fifteenth non-limiting illustrative embodiment of the present invention, a timepiece is provided, and characterized in that it includes a regulating member (41, 41', 41") according to the any one of the first, second, third, fourth, fifth, sixth, seventh eighth. ninth, tenth eleventh, twelfth, thirteenth and fourteenth non-limiting embodiments of the present invention.

In accordance with a sixteenth non-limiting embodiment of the present invention, a method (1) of manufacturing a one-piece regulating member (41, 41', 41") is provided wherein the method includes the following steps: (a) providing (100) a substrate (3) including a top layer (5) and a bottom layer (7) of silicon-based materials, (b) selectively etching (101) at least one cavity (10, 11) in the top layer (5) to define the pattern of a first part (19) of a collet (55, 55', 55"), and a first part (17) of a balance (43, 43', 43") made of silicon-based materials, of the member, wherein the method further includes the following steps: (c) joining (102) an additional layer (21) of silicon-based material to the etched top layer (5) of the substrate (3), (d) selectively etching (103) at least one cavity (20, 24) in the additional layer (21) to continue the pattern (19, 23) of the first parts of the collet (55, 55', 55") and of the balance (43, 43', 43") and to define the pattern (27) of a balance spring (53, 53', 53"), made of silicon-based material, of the member, (e) selectively etching (105, 108, 112) at least one cavity (26, 28, 29, 30, 31, 32) in the bottom layer (7) to define the last part (34) of the balance (43, 43', 43") made of silicon-based material, of the member, and (f) releasing the regulating member (41, 41', 41") from the substrate (3). In accordance with a seventeenth non-limiting illustrative embodiment of the present invention, the sixteenth non-limiting embodiment is modified so that, after step (d), the method further includes the following step: (g) oxidising the balance spring (53, 53', 53") made of silicon-based material, of the member, so as to adjust the thermo-elastic coefficient thereof and also to make the balance spring more mechanically resistant.

In accordance with an eighteenth non-limiting illustrative embodiment of the present invention the sixteenth and seventeenth non-limiting embodiments are further modified so that, prior to step (e), the method further includes the following step: (g) selectively depositing (107, 110) at least one metal layer (61, 63, 64, 66) on the bottom layer (7) to define the pattern of at least one metal part of the member. In accordance with a nineteenth non-limiting illustrative embodiment of the present invention, the eighteenth embodiment is further modified so that step (h) includes the following step: (i) growing (107) the deposition by successive metal layers at least partially over the surface of the bottom layer (7) so as to form a metal part 61 for increasing the mass of the balance (43') made of silicon based materials. In accordance with a twentieth non-limiting illustrative embodiment of the present invention the eighteenth and nineteenth non-limiting embodiments of the invention are further modified so that step (h) includes the following phase: growing (107) the deposition by successive metal layers at least partially over the surface of the bottom layer (7) so as to form a second metal part (63) for receiving an arbour (49) that is driven therein. In accordance with a twenty-first non-limiting illustrative embodiment of the present invention, the eighteenth non-limiting embodiment is further modified so that step (h) includes the following phases: (i) selectively etching (109) at least one cavity (60) in the bottom layer (7) for receiving the at least one metal part; and (k) growing (110) the deposition by successive metal layers at least partially in the at least one cavity so as to form a metal part (64) for increasing the mass of the balance (43") made of silicon-based materials.

In accordance with a twenty-second non-limiting illustrative embodiment of the present invention, the eighteenth and twenty-first non-limiting embodiments are further modified so that step (h) includes the following phases: (j') selectively etching (109) at least one cavity (62) in the bottom layer (7) for receiving the at least one metal part; and (k') growing (110) the deposition by successive metal layers at least partially in the at least one cavity so as to form a second metal part (63) for receiving an arbour (49) that is driven therein. In accordance with a twenty-third non-limiting illustrative embodiment of the present invention, the eighteenth, nineteenth, twentieth, twenty-first and twenty-second non-limiting embodiments are further modified so that that step (h) is followed by the following step: (I) polishing (111) the metal deposition (61, 63, 64, 66). In accordance with a twenty-fourth non-limiting embodiment of the present invention, the sixteenth, seventeenth, eighteenth, nineteenth, twentieth, twenty-first, twenty-second and twenty-third non-limiting embodiments are further modified so that several regulating members (41, 41', 41") are made on the same substrate (3).

BRIEF DESCRIPTION OF THE DRAWINGS

Other features and advantages will appear clearly from the following description, which is given by way of non-limiting illustration, with reference to the annexed drawings, in which.

DETAILED DESCRIPTION OF PREFERRED EMBODIMENTS

The invention relates to a method, generally designated 1, for fabricating a regulating member 41, 41', and 41" for a timepiece movement. As illustrated in FIGS. 1 to 9, method 1 includes successive steps for forming at least one type of one-piece member (51'", 41, 41', 41"), which may be entirely formed of silicon-based materials.

Figure 1:
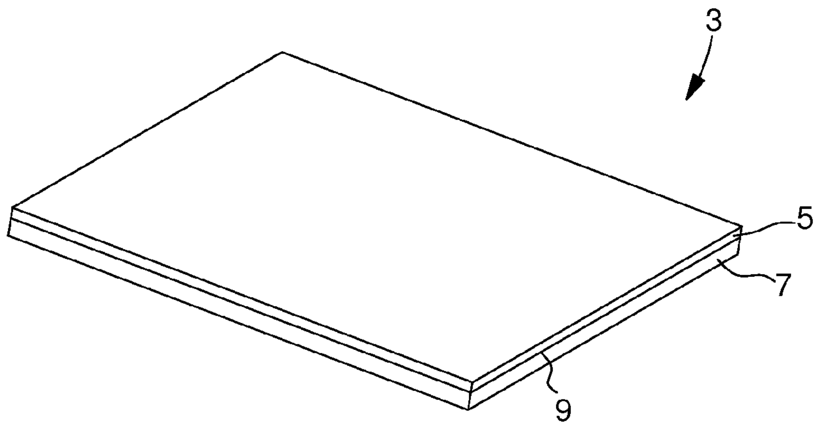
FIGS. 1 to 5 show successive views of the manufacturing method according to the invention.
Figure 9:
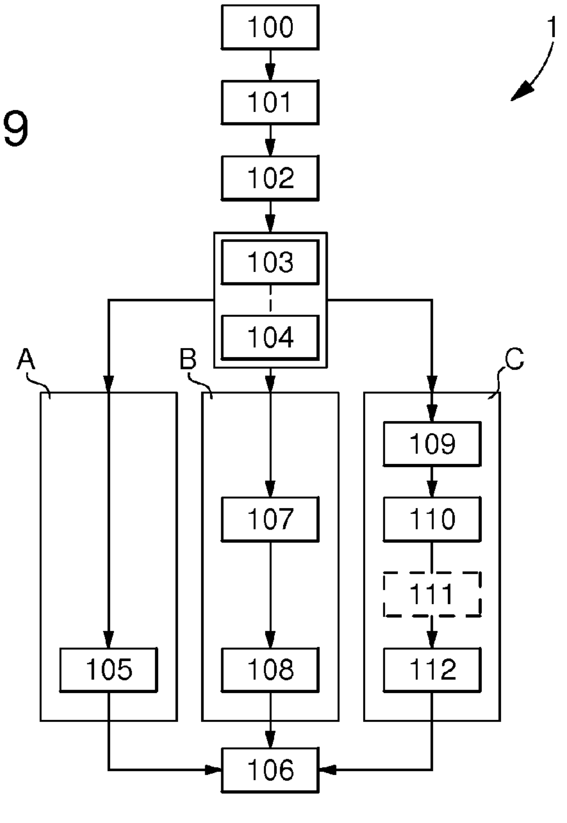
FIG. 9 shows a flow chart of the method according to the invention.

With reference to FIGS. 1 and 9, the first step 100 consists in taking a silicon-on-insulator (SOI) substrate 3. Substrate 3 includes a top layer 5 and a bottom layer 7 each formed of silicon-based material. An intermediate layer 9, formed of silicon dioxide ($SiO_2$) may extend between top layer 5 and bottom layer 7.

Preferably, in this step 100, substrate 3 is selected such that the height of bottom layer 7 matches the height of one part of the final regulating member 41, 41', 41". Moreover, the thickness of bottom layer 7 must be sufficient to bear the efforts induced by method 1. This thickness may be for example comprised between 300 and 400 μm.

Preferably, top layer 5 is used as spacing means relative to bottom layer 7. Consequently, the height of top layer 5 will be adapted in accordance with the configuration of regulating member 41, 41', 41". Depending upon the configuration, the thickness of top layer 5 may thus fluctuate, for example, between 10 and 200 μm.

Figure 2:
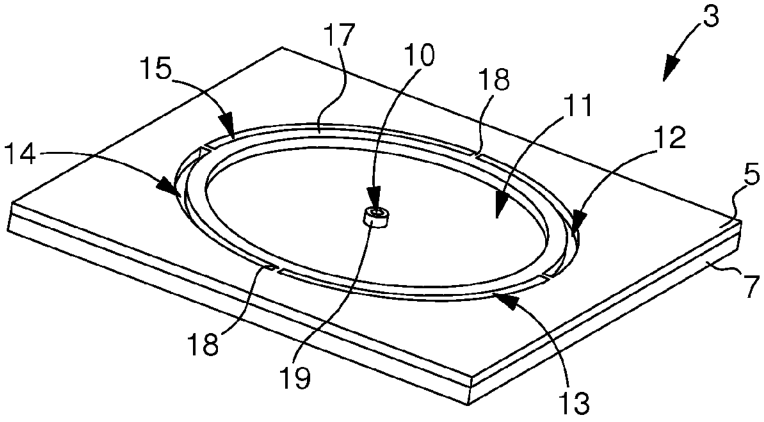

In a second step 101, seen in FIG. 2, cavities 10, 11, 12, 13, 14 and 15 are selectively etched, for example by a DRIE (deep reactive ionic etch) process, in top layer 5 of silicon-based material. These cavities 10, 11, 12, 13, 14 and 15 preferably form two patterns 17, 19 that define the inner and outer contours of silicon parts of the regulating member 41, 41', 41".

In the example illustrated in FIG. 2, patterns 17 and 19 are approximately coaxial and cylinder-shaped with a circular section and pattern 17 has a larger diameter than that of pattern 19. However, advantageously according to method 1, the etch on top layer 5 leaves complete freedom as regards the geometry of patterns 17 and 19. Thus, patterns 17 and 19 are not necessarily circular, but, could be for example, be elliptical and/or have a non-circular inner diameter.

Bridges of material 18 are preferably left to hold regulating member 41, 41', 41" to substrate 3 during manufacture. In the example illustrated in FIG. 2, there are four bridges of material 18, which remain respectively between each of consecutive cavities 12, 13, 14 and 15, distributed in an arc of a circle on the periphery of pattern 17.

Figure 3:
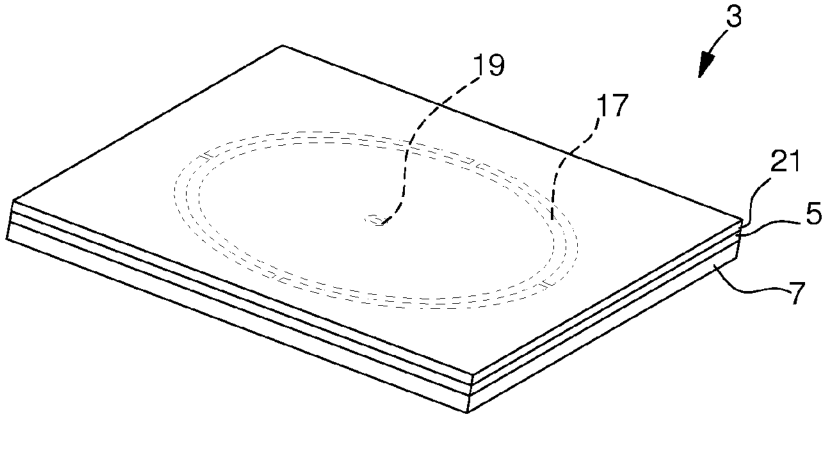

In a third step 102, shown in FIG. 3, an additional layer 21 of silicon-based material is added to substrate 3. Preferably, additional layer 21 is secured to top layer 5 by means of silicon fusion bonding (SFB). Thus, step 102 advantageously covers top layer 5 by binding the top faces of patterns 17 and 19, with a very high level of adherence, to the bottom face of additional layer 21. Additional layer 21 may, for example, have a thickness of between 100 and 150 μm.

Figure 4:
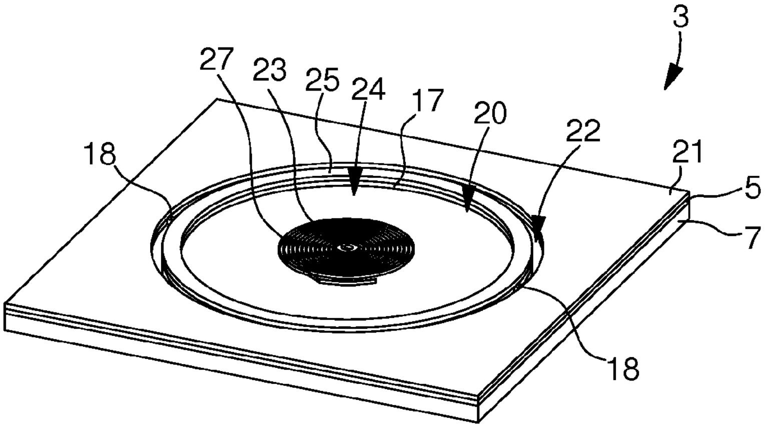

In a fourth step 103, shown in FIG. 4, cavities 20, 22 and 24 are selectively etched, for example, by a DRIE process similar to that of step 101, in additional silicon layer 21. These cavities 20, 22 and 24 form three patterns 23, 25 and 27, which define the inner and outer contours of the silicon parts of regulating member 41, 41'. 41".

In the example illustrated in FIG. 4, patterns 23 and 25 are approximately coaxial and cylindrical with a circular section, and pattern 27, is approximately spiral-shaped. However, advantageously according to method 1, the etch on additional layer 21 allows complete freedom for the geometry of patterns 23, 25 and 27. Thus, in particular, patterns 23 and 25 are not necessarily circular but may, for example, be elliptical or have a non-circular inner diameter. The same is true for inner diameters 10 and 24, which are not necessarily circular but may, for example, be polygonal, which would improve the transmission of stress forces in rotation with an arbour 49 of matching shape. Finally, the shape of each diameter 10, 24 might not be identical.

Preferably, pattern 23 made in additional layer 21 is of similar shape and approximately plumb with pattern 19, made in top layer 5. This means that cavities 10 and 24, respectively forming the inner diameter of patterns 19 and 23, communicate with each other and are substantially one on top of the other. In the example illustrated in FIGS. 10 to 15, patterns 23 and 19 form collet 55, 55', 55" of regulating member 41, 41', 41" which extends across the top heightswise with respect to layers 5 and 21.

Preferably, pattern 25 made in additional layer 21 is of similar shape and approximately plumb with pattern 17 made in top layer 5. In the example illustrated, patterns 25 and 17 form one part of the felloe 47, 47', 47" of the balance 43, 43', 43" of regulating member 41, 41', 41" which extends heightswise with respect to layers 5 and 21. It will be noted, however, that in the example illustrated in FIG. 4, bridges of material 18 are not reproduced and that cavity 22 in additional layer 21 forms a continuous ring, unlike cavities 12, 13, 14 and 15 which open out underneath the layer in FIG. 4.

Preferably, patterns 23 and 27 are etched at the same time, and form a one-piece part in additional layer 21. In the example illustrated in FIGS. 10 to 15, patterns 23 and 27 form the balance spring 53, 53', 53" and the top part of collet 55, 55', 55" of regulating member 41, 41', 41". It can also be seen that the outer curve of pattern 27 illustrated in FIG. 4 is open. This latter feature, combined with the separation from bottom layer 7 achieved via pattern 19, means that the outer curve can be pinned up to the collet using an index assembly.

However, advantageously according to method 1, the etch on additional layer 21 allows complete freedom as to the geometry of pattern 27. Thus, in particular, pattern 27 might not have an open outer curve but, for example, have a bulge portion on the end of the outer curve that can be used as a point of attachment, i.e. without requiring an index assembly. Pattern 27 may also have an inner coil comprising a Grossmann curve for improving its concentric development, as explained in EP Patent No. 1 612 627 and corresponding U.S. Patent Application Publication No. US 2006/0002241 A1, which are both incorporated herein by reference.

After this fourth step 103, it is clear that patterns 23 and 27 etched in additional layer 21 are only connected by the bottom of pattern 23, with a very high level of adherence, above pattern 19, which is etched in top layer 5 (pattern 19 is itself connected, with a very high level of adherence, to bottom layer 7). Patterns 23 and 27 are thus no longer in direct contact with additional layer 21. Likewise, pattern 25 is no longer in direct contest with additional layer 21 but only connected, with a very high level of adherence, to pattern 17, which is etched in top layer 5.

Preferably, as shown in dotted lines in FIG. 9, method 1 can include a fifth step 104 that consists in oxidising at least pattern 27, i.e. the balance spring 53, 53', 53" of regulating member 41, 41', 41" so as to make the balance spring more mechanically resistant and to adjust its thermo-elastic coefficient. This oxidising step is explained in EP Patent No. 1 422 436 and corresponding U.S. Patent Application Publication No. US 2005/0281137 A1, which are both incorporated herein by reference.

Figure 16:
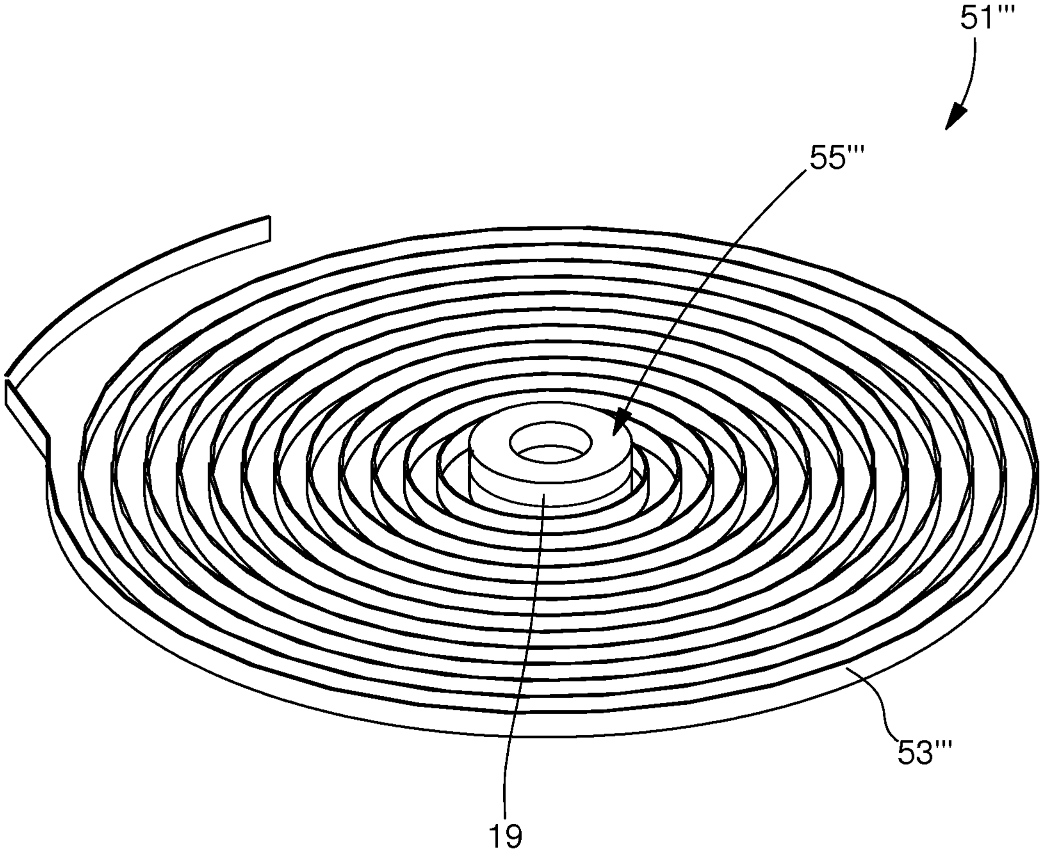
FIG. 16 is a perspective diagram of a one-piece hairspring according to the invention.

At this stage, i.e. after step 103 or 104, it is clear that method 1 advantageously produces only hairspring 51''' as seen in FIG. 16. Indeed, one of the advantages of method 1 is that it can adapt the height of pattern 19 of collet 55, 55', 55", 55''' projecting from balance spring 53, 53', 53", 53''' directly, by selecting the height of top layer 5.

When this product 51''', seen in FIG. 16, is desired, method 1 can thus simply be stopped at step 103 or 104 by forming bridges of material at the intermediate step. These bridges of material can be formed either on pattern 19 during step 101 or on pattern 27 at the end, for example, of the last coil, during step 103. The penultimate step of method 1 could then consist in removing bottom layer 7, for example, by chemical etching and/or mechanical means. Finally, in step 106, the balance spring 51''' thereby obtained, is released.

Advantageously according to the invention, if a regulating member 41, 41', 41" is preferred, after fourth step 103, or preferably after fifth step 104, method 1 can include three embodiments A, B and C, as illustrated in FIG. 9. However, each of the three embodiments A, B and C ends with the same final step 106, which consists in releasing the manufactured regulating member 41, 41', 41" from substrate 3.

Advantageously, release step 106 can be achieved simply by applying sufficient stress to regulating member 41, 41', 41" to break bridges of material 18. This stress may, for example, be generated manually by an operator or by machining.

Figure 5:
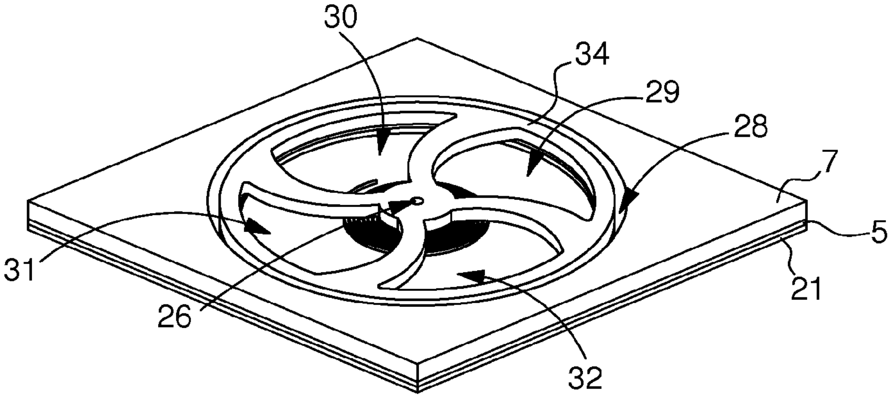

According to embodiment A, in a sixth step 105, shown in FIG. 5, cavities 26, 28, 29, 30, 31 and 32 are selectively etched, for example by a similar DRIE process to that of steps 101 and 103, in bottom layer 7 of silicon-based material. These cavities 26, 28, 29, 30, 31 and 32 form a pattern 34, which defines the inner and outer contours of a silicon part of regulating member 41.

In the example illustrated in FIG. 5, pattern 34 is approximately rim-shaped with four arms 40, 42, 44, 46. However, advantageously according to method 1, the etch in bottom layer 7 leaves complete freedom as to the geometry of pattern 34. Thus, in particular, the number and geometry of arms can be different as the rim is not necessarily circular but for example elliptical. Moreover the arms 40, 42, 44, 46 can be slimmer so as to allow them to deform axially and/or radially in the event of any shock transmitted to the regulating member.

Preferably, one part of pattern 34 made in bottom layer 7 is of similar shape and approximately plumb with patterns 17 and 25 made respectively in top layer 5 and additional layer 21. In the example illustrated in FIG. 5, pattern 34 forms, with patterns 17 and 25, the balance 43 of regulating member 41, whose felloe 47 thus extends heightswise with respect to all of layers 5, 7 and 21.

Moreover, preferably, cavity 26 of pattern 34 is approximately in the extension of cavities 10 and 24 that form the inner diameter of patterns 19 and 23. In the example illustrated, the series of cavities 24, 10 and 26 thus forms an inner diameter that can receive balance staff 49 of regulating member 41. It will be noted, finally, that bridges of material 18 are not reproduced in bottom layer 7 and that cavity 28, like cavity 22, forms a continuous ring unlike cavities 12, 13, 14 and 15 which open out underneath the cavity in FIG. 5.

After this sixth step 105, it is clear that pattern 34 etched in bottom layer 7 is only connected, with a very high level of adherence, to patterns 17 and 19, which are etched in top layer 5. Pattern 34 is thus no longer in direct contact with bottom layer 7.

Figure 10:
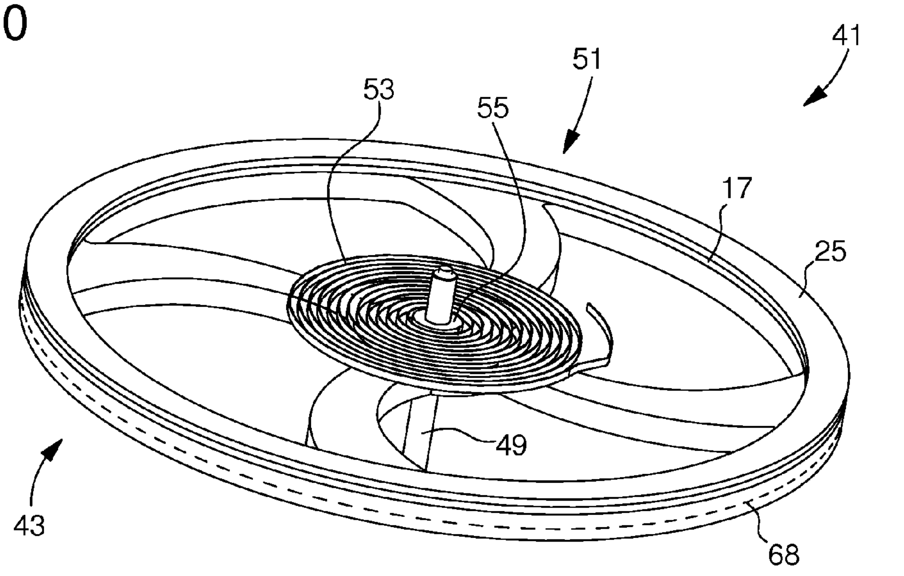
FIGS. 10 and 11 are perspective diagrams of a one-piece regulating member according to a first embodiment.
Figure 11:
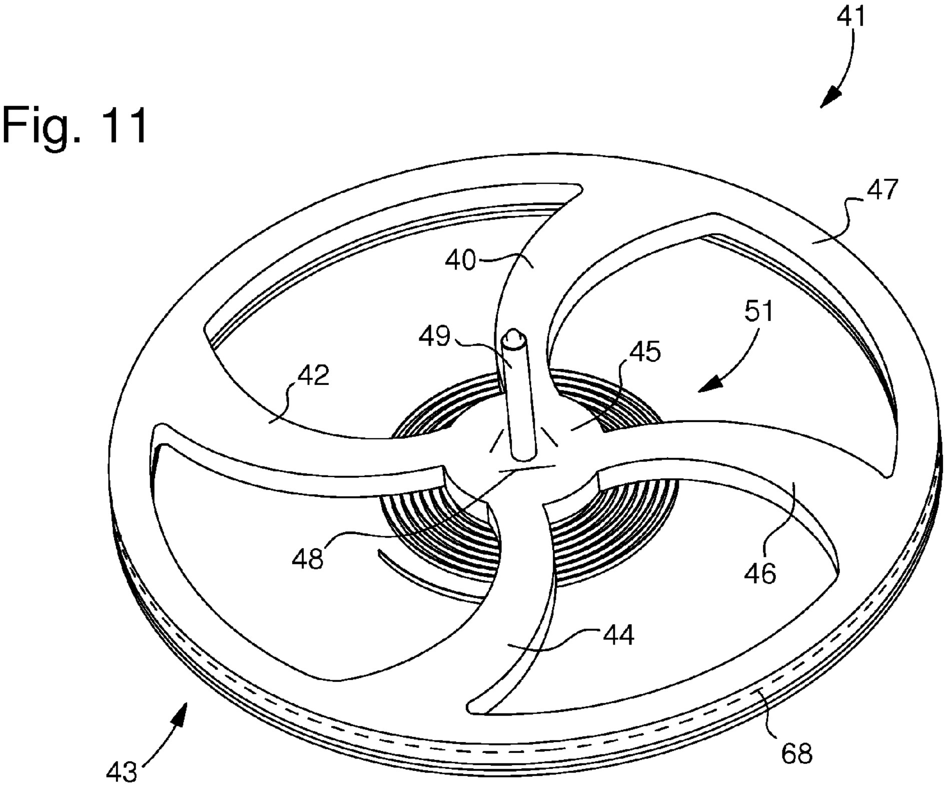

After final step 106, explained above, first embodiment A thus produces a one-piece regulating member 41, formed entirely of silicon-based materials, as shown in FIGS. 10 and 11. It is thus clear that there are no longer any assembly problems, since assembly is performed directly during manufacture of regulating member 41. The latter includes a balance 43, whose hub 45 is connected radially to felloe 47 by four arms 40, 42, 44 and 46, and axially to hairspring 51, which includes a balance spring 53 and a collet 55.

As explained above, felloe 47 is formed by the peripheral ring of pattern 34 of bottom layer 7, but also by patterns 17 and 25 of the respective top 5 and additional 21 layers. Moreover, collet 55 is formed by pattern 23 of additional layer 21 and pattern 19 of top layer 5. This pattern 19 is preferably used as spacing means between the hairspring 51 and balance spring 43, so that, for example, balance spring 53 can be pinned up to the collet using an index assembly. Pattern 19 is also useful as guide means for hairspring 51 by increasing the height of collet 55.

However, advantageously according to method 1, the etch carried out on additional layer 21 allows complete freedom as to the geometry of balance spring 53. Thus, in particular, balance spring 53 might not have an open outer curve but, for example have, on the end of the outer curve, a bulge portion that can be used as a point of attachment, i.e. without requiring an index assembly.

Preferably, regulating member 41 can receive a balance staff 49 through cavities 24, 10 and 26. Advantageously, according to the invention, as regulating member 41 is in one-piece, it is not necessary to secure balance staff 49 to collet 55 and to balance 43, but only to one of these two members.

Preferably, balance staff 49 is be secured to the internal diameter 26 of balance 43 for example using resilient means 48 etched in silicon-based hub 45 during step 105. These resilient means 48 may, for example, take the form of those disclosed in FIGS. 10A to 10E of EP Patent No. 1 655 642 and its corresponding U.S. Patent Application Publication No. US 2006/0055097 A1, or those disclosed in FIGS. 1, 3 and 5 of EP Patent No. 1 584 994 and its corresponding U.S. Patent Application Publication No. US 2005/0219957 A1, wherein EP 1 655 642 and corresponding U.S. Patent Application Publication No. US 2006/0055097 A1, as well as EP 1 584 994 and corresponding U.S. Patent Application Publication No. US 2005/0219957 A1, are all incorporated herein by reference. Moreover, in a preferred manner, the sections of cavities 24 and 10 have larger dimensions than that of cavity 26 so as to prevent balance staff 49 coming into push fit contact with collet 55.

It is thus clear that the force of hairspring 51 is subjected to balance 43 only by collet 55 and vice versa, since they are all three formed in a single piece. Balance staff 49 therefore only receives forces from regulating member 41 via hub 45 of balance 43.

Figure 6:
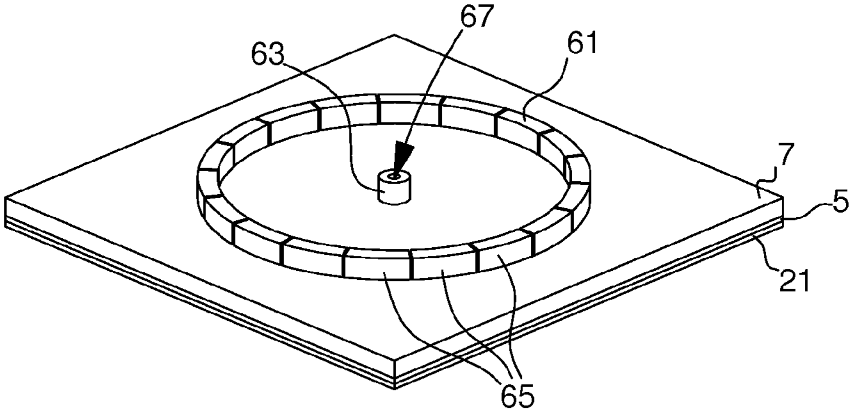
FIGS. 6 to 8 shows views of successive steps of alternate embodiments.

According to a second embodiment B, after step 103 or 104, method 1 includes a sixth step 107, shown in FIG. 6, consisting in implementing a LIGA process (from the German "röntgenLlthographie, Galvanoformung & Abformung"). This process includes a series of steps for electroplating a metal on the bottom layer 7 of substrate 3 in a particular shape, using a photostructured resin. As this LIGA process is well known, it will not be described in more detail here. Preferably, the metal deposited may be, for example, gold or nickel or an alloy of these metals.

In the example illustrated in FIG. 6, step 107 may consist in depositing a notched ring 61 and/or a cylinder 63. In the example illustrated in FIG. 6, ring 61 has a series of studs 65 approximately in the arc of a circle and it is used for increasing the mass of the future balance 43'. In fact one of the advantages of silicon is its insensitivity to temperature variations. However, it has the drawback of having low density. A first feature of the invention thus consists in increasing the mass of balance 43' using metal obtained by electroplating in order to increase the inertia of the future balance 43'. However, in order to keep the advantages of silicon, the metal deposited on bottom layer 7 includes a space between each stud 65 that can compensate for any thermal expansion of ring 61.

In the example illustrated in FIG. 6, cylinder 63 is for receiving a balance staff 49, which is advantageously driven therein. In fact, another drawback of silicon is that it has very small elastic and plastic zones, which means that it is very brittle. Another feature of the invention thus consists in tightening balance staff 49, not against the silicon based material of balance 43', but on the inner diameter 67 of metal cylinder 63, electroplated during step 107. Advantageously, according to method 1, the cylinder 63 obtained by electroplating allows complete freedom as regards its geometry. Thus, in particular, the inner diameter 67 is not necessarily circular, but for example polygonal, which could improve the transmission of force in rotation with an staff 49 of matching shape.

Figure 12:
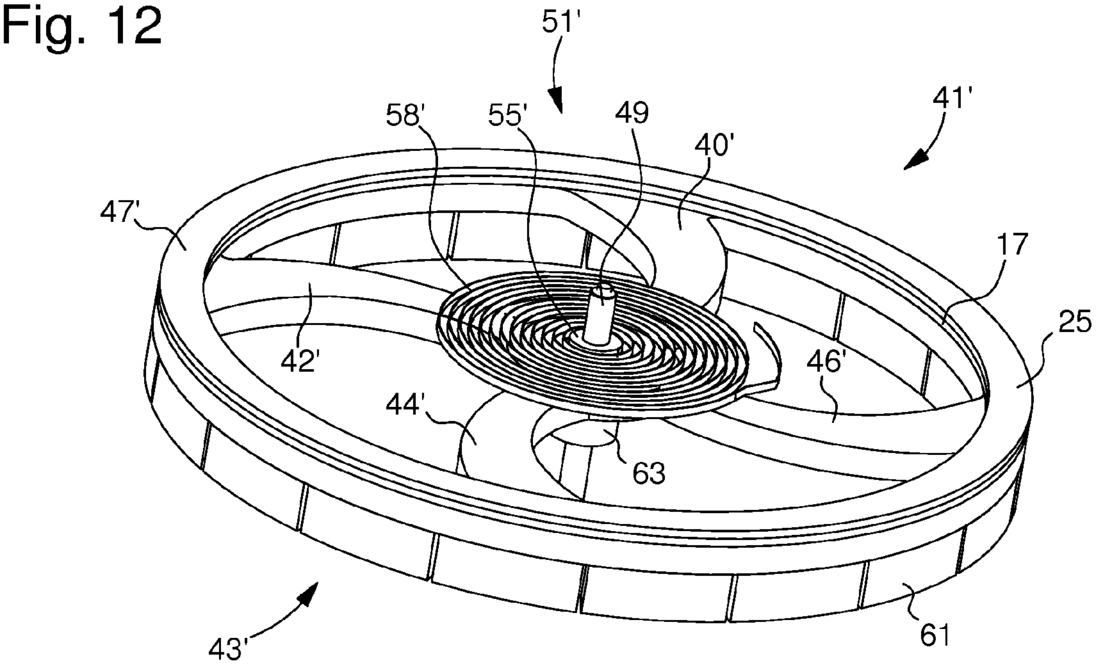
FIGS. 12 and 13 are perspective diagrams of a one-piece regulating member according to a second embodiment.
Figure 13:
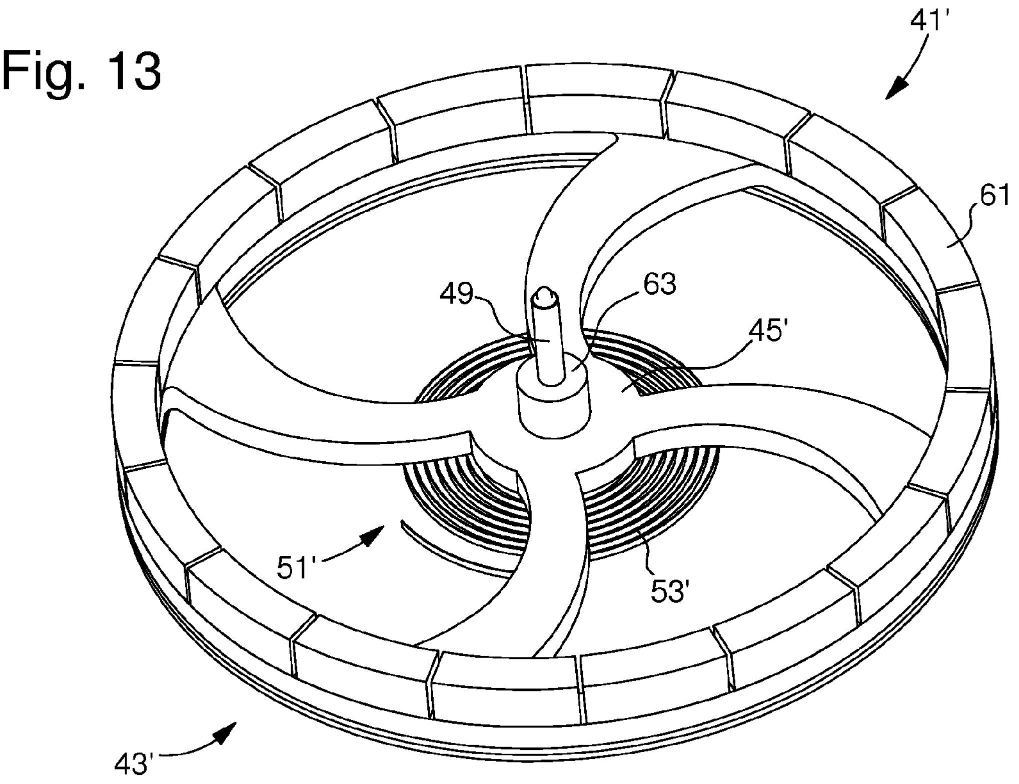

In a seventh step 108, similar to step 105 shown in FIG. 5, cavities are selectively etched, for example by a DRIE method, in bottom layer 7 of silicon-based material. These cavities form a similar balance pattern to pattern 34 of embodiment A. As illustrated in the example of FIGS. 12 and 13, the pattern obtained may be approximately rim-shaped with four arms 40', 42', 44', 46'. However, advantageously according to method 1, the etch over bottom layer 7 allows complete freedom as to the geometry of pattern 34. Thus, in particular, the number and geometry of the arms may be different, and the rim is not necessarily circular but, may be, for example, elliptical. Moreover, arms 40', 42', 44', 46' may be slimmer to allow them to deform axially and/or radially in the event of any shock transmitted to the regulating member.

Preferably, one part of the balance pattern made in bottom layer 7 is of similar shape and approximately plumb with patterns 17 and 25 respectively made during steps 101 and 103 in top layer 5 and additional layer 21. In the example illustrated in FIGS. 12 and 13, the balance pattern forms, with patterns 17 and 25 and metal parts 61 and/or 63, the balance 43' of regulating member 41', whose felloe 47' thus extends heightswise with respect to all of layers 5, 7 and 21 of metal parts 61 and/or 63.

Moreover, preferably, as in embodiment A, the successive cavities then form an inner diameter that can receive balance staff 49 of regulating member 41'. It will be noted, finally, that bridges of material 18 might also not be reproduced in bottom layer 7.

After this seventh step 108, it is clear that the balance pattern etched in bottom layer 7 is only connected, with a very high level of adherence, to patterns 17 and 19 of bottom layer 5, which were etched during step 101. The balance pattern is thus no longer in direct contact with bottom layer 7.

After the final step 106, explained above, the second embodiment B thus produces a one-piece, regulating member 41', formed of silicon-based materials with one or two metal parts 61, 63, as seen in FIGS. 12 and 13. It is thus clear that there is no longer any assembly problem since assembly is carried out directly during manufacture of regulating member 41'. The latter includes a balance 43', whose hub 45' is connected radially to felloe 47' by four arms 40', 42', 44' and 46', and axially to hairspring 51', which includes a balance spring 53' and a collet 55'.

As explained above, felloe 47' is formed by the peripheral ring of the balance pattern of bottom layer 7, but also by patterns 25 and 17 of top layer 5 and additional layer 21 and, possibly, of metal part 61. Moreover, collet 55' is formed by pattern 23 of additional layer 21 and pattern 19 of top layer 5. This pattern 19 is preferably used as spacing means between hairspring 51' and balance 43' so that balance spring 53' can be pinned up to the collet using an index assembly. Pattern 19 is also useful as guide means for hairspring 51' by increasing the height of collet 55'.

However, advantageously according to method 1, the etch on additional layer 21 leaves complete freedom as to the geometry of balance spring 53'. Thus, in particular, balance spring 53' might not have an open outer curve but, could, for example, have a bulge portion on the end of the outer curve that can be used as a fixed point of attachment, i.e. without requiring an index assembly.

Preferably, regulating member 41' is able to receive a balance staff 49 in its inner diameter. Advantageously, according to the invention, as regulating member 41' is in one-piece, it is not necessary to secure balance staff 49 to collet 55' and to balance 43', but only to one of these two members.

In the example illustrated in FIGS. 12 and 13, balance staff 49 is secured, preferably, to the inner diameter 67 of metal part 63, for example by being driven therein. Moreover, preferably, the sections of cavities 24 and 10 have larger dimensions than that of inner diameter 67 of metal part 63 to prevent balance staff 49 coming into push fit contact with collet 55'.

It is clear therefore that the stress of hairspring 51' is only subjected to the balance 43' by collet 55' and vice versa, since all three are formed in one-piece. Balance staff 49 thus preferably only receives forces from regulating member 41' via metal part 63 of hub 45' of balance 43'.

Moreover, since a metal part 61 has been deposited, the inertia of balance 43' is advantageously amplified. Indeed, as the density of a metal is much greater than that of silicon, the mass of balance 43' is increased as is, incidentally, its inertia.

Figure 7:
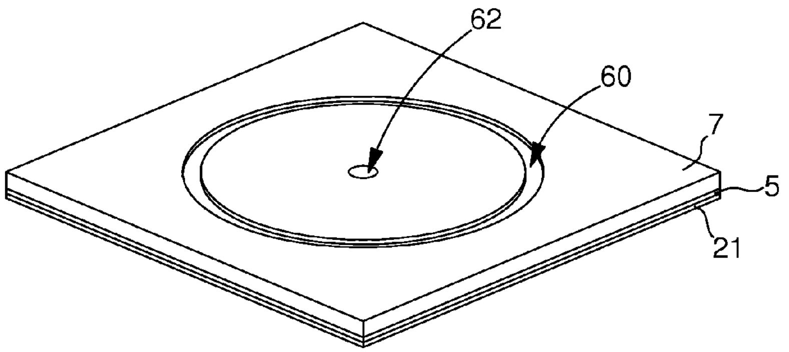

According to a third embodiment C, after step 103 or 104, method 1 includes a sixth step 109 shown in FIG. 7, consisting in selectively etching cavities 60 and/or 62, for example, by a DRIE process, to a limited depth in bottom layer 7 of silicon-based material. These cavities 60, 62 form recesses that can be used as containers for at least one metal part. As in the example illustrated in FIG. 7, the cavities 60 and 62 obtained can respectively take the form of a ring and disc. However, advantageously according to method 1, the etch of bottom layer 7 allows complete freedom as to the geometry of cavities 60 and 62.

Figure 8:
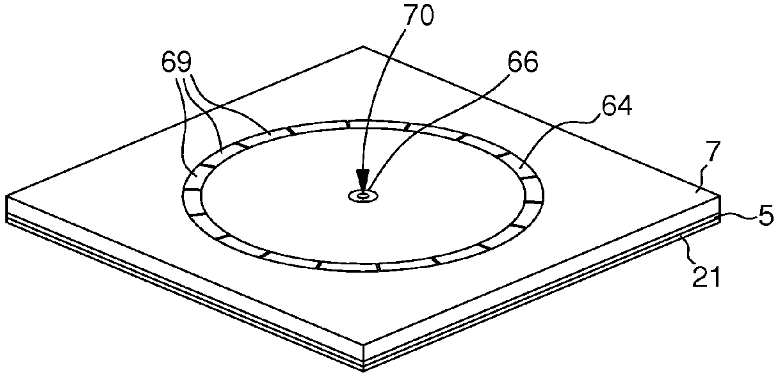

In a seventh step 110, as illustrated in FIG. 8, method 1 includes implementation of a galvanic growth or LIGA process for filling cavities 60 and/or 62 in accordance with a particular metal shape. Preferably, the deposited metal may be, for example, gold or nickel.

In the example illustrated in FIG. 8, step 110 may consist in depositing a notched ring 64 in cavity 60 and/or a cylinder 66 in cavity 62. Moreover, in the example illustrated in FIG. 8 ring 64 has a series of studs 69 approximately in the arc of a circle and it is advantageously used for increasing the mass of balance 43". As already explained above, a drawback of the silicon is its low density. Thus as for the embodiment B, a feature of the invention consists in increasing the moss of balance 43" using electroplated metal in order to inverse the inertia of the future balance 43". However, in order to keep the advantages of silicon, the metal deposited on bottom layer 7 includes a space between each stud 69 that can compensate for any thermal expansion of ring 64.

In the example illustrated in FIG. 8, cylinder 66 is for receiving a balance staff 49, which is advantageously driven therein. In fact, as already explained above, one advantageous feature of the invention consists in tightening balance staff 49 not against the silicon-based material, but on the inner diameter 70 of metal cylinder 66, which is electroplated during step 110. Advantageously according to method 1, the electroplated cylinder 66 allows complete freedom as to its geometry. Thus, in particular, the inner diameter 70 is not necessarily circular but, for example, polygonal, which could improve the transmission of force in rotation with an balance staff 49 of matching shape.

Preferably, method 1 can include an eighth step 111, consisting in polishing the metal deposition(s) 64, 66 made during step 110, in order to make them flat.

Figure 14:
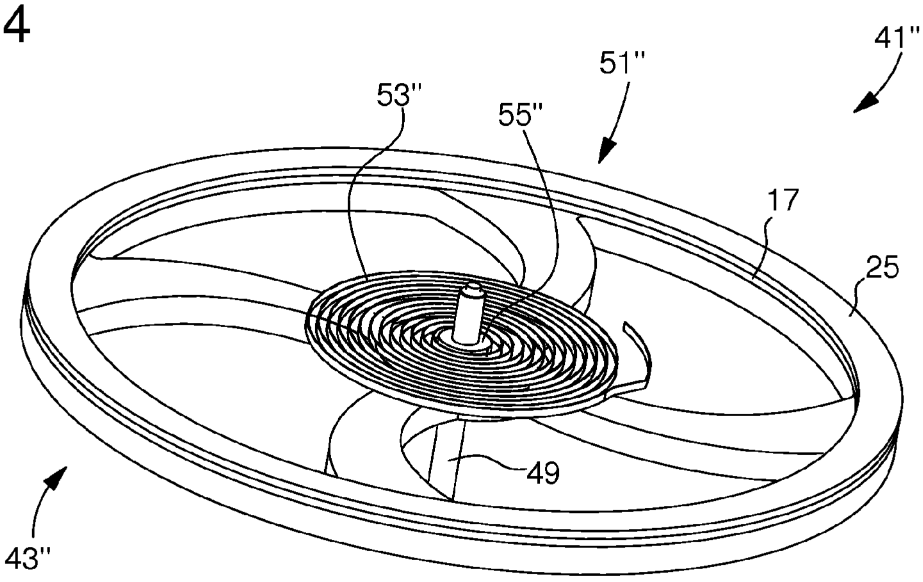
FIGS. 14 and 15 are perspective diagrams of a one-piece regulating member according to a third embodiment.
Figure 15:
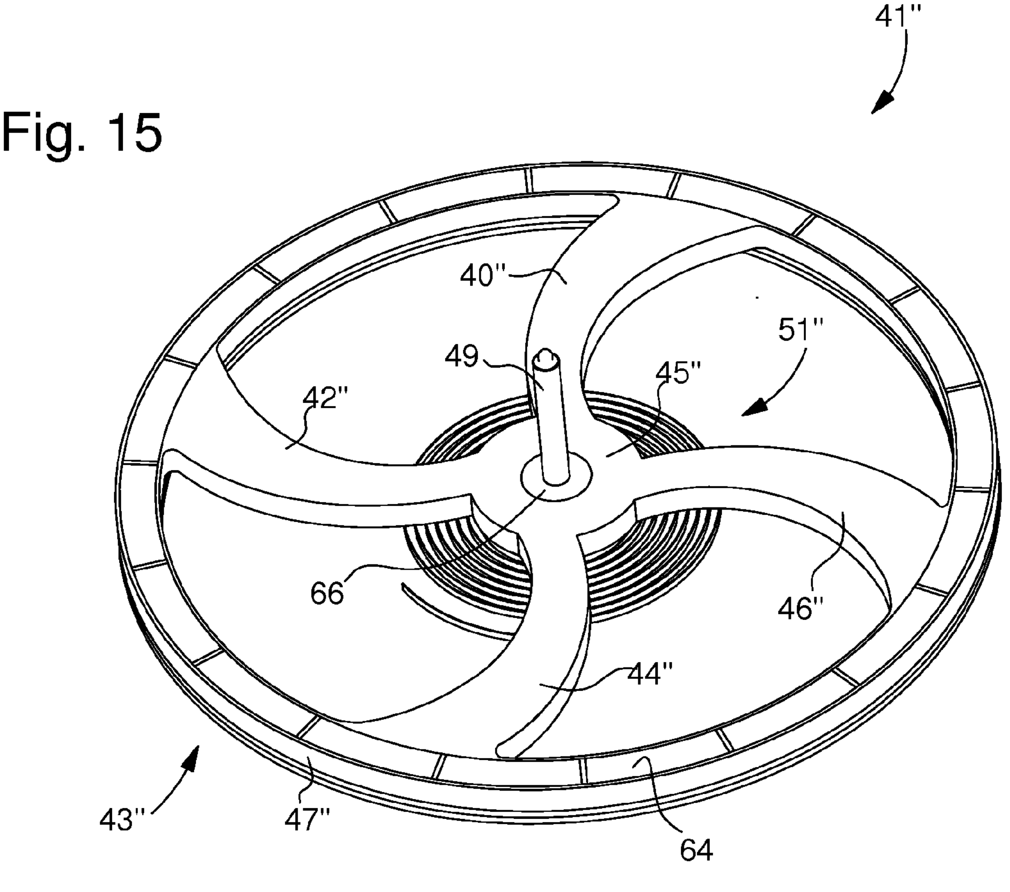

In a ninth step 112, similar to steps 105 or 108 shown in FIG. 5, cavities are selectively etched, for example, by a DRIE process, in bottom layer 7 of silicon-based material. These cavities form a balance pattern similar to pattern 34 of the first embodiment A. As illustrated in the example of FIGS. 14 and 15, the pattern obtained may be approximately rim-shaped with four arms 40", 42", 44", 46". However, advantageously according to method 1, the etch on the bottom layer 7 leaves complete freedom as to the geometry of pattern 34. Thus, in particular, the number and geometry of arms 40", 42", 44", 46" may be different, and the rim is not necessarily circular, but may be elliptical, for example. Moreover, the arms may be slimmer to allow them to deform axially and/or radially in the event of any shock transmitted to the regulating member.

Preferably, the balance pattern made in bottom layer 7 is of similar shape to and approximately plumb with patterns 17 and 25 respectively made during steps 101 and 103 in top layer 5 and additional layer 21. In the example illustrated, the balance pattern forms, with patterns 17 and 25 and metal parts 64 and/or 66, the balance 43" of regulating member 41", whose felloe 47" thus extends across the top of all of layers 5, 7 and 21.

Moreover, preferably, as in embodiments A and B, the successive cavities thus form an inner diameter that can receive balance staff 49 of regulating member 41". It will be noted, finally, that bridges of material 18 are no longer reproduced in bottom layer 7.

After this ninth step 112, it is clear that the balance pattern etched in bottom layer 7 is only connected, with a very high level of adherence, to patterns 17 and 19 of top layer 5, etched during step 101. The balance pattern is thus no longer in direct contact with bottom layer 7.

After final step 106 explained above, a one-piece, regulating member 41" formed of silicon-based materials, with one or two metal parts 64, 66 is obtained, as seen in FIGS. 14 and 15. It is thus clear that there are no longer any assembly problems, since assembly is carried out directly during manufacture of the regulating member 41". The latter includes a balance 43", whose hub 45" is radially connected to felloe 47" by four arms 40", 42", 44" and 46" and axially connected to hairspring 51", which includes a balance spring 53" and a collet 55".

As explained above, felloe 47" is formed by the peripheral ring of the balance pattern of bottom layer 7, but also by patterns 25 and 17 of the respective top and bottom layers 5 and 21, and possibly, metal part 64. Moreover, collet 55" is formed by pattern 23 of additional layer 21 and pattern 19 of top layer 5. Preferably, this pattern 19 is used as spacing means between hairspring 51" and balance 43", so that, for example balance spring 53" can be pinned up to the collet using an index assembly. Pattern 19 is also useful as guide means for hairspring 51" by increasing the height of collet 55".

However, advantageously according to method 1, the etch on additional layer 21 leaves complete freedom as to the geometry of balance spring 53". Thus, in particular, balance spring 53" might not have an open outer curve but, could, for example, have a bulge portion on the end of the outer curve that can be used as a fixed point of attachment, i.e. without requiring an index assembly.

Preferably, regulating member 41' is able to receive a balance staff 49 in its inner diameter. Advantageously according to the invention, as regulating member 41" is in one-piece, it is not necessary to secure balance staff 49 to collet 55" and to balance 43", but only to one of these two members.

In the example illustrated in FIGS. 14 and 15, balance staff 49 is secured, preferably, to the inner diameter 70 of metal part 66, for example be being driven therein. Moreover, preferably, the sections of cavities 24 and 10 have larger dimensions than that of inner diameter 70 of metal part 66 to prevent balance staff 49 coming into push fit contact with collet 55".

It is clear therefore that the stress of hairspring 51" is only subjected to the balance 43" by collet 55" and vice versa, since all three are formed in one-piece. Balance staff 49 thus preferably only receives stress forces from regulating member 41" via metal part 66 of hub 45" of balance 43".

Moreover, since a metal part 64 has been deposited, the inertia of balance 43" is advantageously amplified. Indeed, as the density of a metal is much greater than that of silicon, the mass of balance 43" is increased as is, incidentally, its inertia.

According to the three embodiments A, B and C, it should be understood that the final regulating member 41, 41' and 41" is thus assembled prior to being structured, i.e. prior to being etched and/or altered by electroplating. This advantageously minimises the dispersions generated by current assemblies of a balance spring with a hairspring.

It should also be noted that the very good structural precision of deep reactive ionic etching decreases the start radius of each of balance springs 53, 53', 53", 53'", i.e. the external diameter of the collet 55, 55', 55", 55'" thereof, which allows the inner and outer diameters of collet 55, 55', 55", 55'" to be miniaturised.

Advantageously, according to the invention, it is also clear that it is possible for several regulating members 41, 41' and 41" to be made on the same substrate 3, which allows batch production.

Of course, the present invention is not limited to the example illustrated, but is capable of various variants and alterations, which will be clear to those skilled in the art. In particular, the patterns 17 and 25 etched during steps 101 and 103 in layers 5 and 21 might not be limited to a flat surface state, but could integrate, during the steps, at least one ornament for decorating at least one of the faces of felloe 47, 47', 47", which may be useful, particularly for skeleton type timepieces.

It is also possible for the electroplated metal parts 63, 66 in embodiments B and C to be inverted, i.e. projecting part 63 of mode B could be replaced by integrated part 66 of mode C or vice versa (which only requires minimum adaptation of method 1, or even for part 66 integrated in the hub to project from bottom layer 7.

In accordance with similar reasoning, it is also possible for metal parts 61, 64 electroplated in embodiments B and C to be inverted, i.e. projecting part 61 of mode B could be replaced by integrated part 64 of mode C or vice versa, or part 64 integrated in the felloe could project from bottom layer 7.

Moreover, method 1 may advantageously also provide, after release step 106, a step of adapting the frequency of regulating member 41, 41', 41". This step could then consist in etching, for example by laser, recesses 68 that can alter the operating frequency of the regulating member. These recesses 68, as illustrated for example in FIGS. 10 and 11, could, for example, be made on one of the peripheral walls of pattern 34 belonging to felloe 47, 47', 47" and/or on one of the electroplated metal parts 61, 64. Conversely, inertia-block regulating structures could also be envisaged for increasing inertia and regulating frequency.

A conductive layer could also be deposited over at least one part of regulating member 41, 41', 41" to prevent isochronism problems. This layer may be of the type disclosed in EP 1 837 722 and in corresponding U.S. Patent Application Publication No. US 2008/0037376 A1, which are both incorporated herein by reference.

Finally, a polishing step like step 111 may also be performed between step 107 and step 108. A step of making a metal deposition 63, 66, of the type obtained by embodiments B and C, could also be envisaged, not on the balance, but, if only hairspring 51'" is being manufactured, on additional layer 21, so that a staff can be driven, not against the silicon-based material of the inner diameter of collet 55'", but against the metal deposition.

In sum then, the present iinvention pertains broadly to a one-piece regulating member (41, 41', 41") including a balance (43, 43', 43") cooperating with a hairspring (51, 51', 51") made in a layer of silicon-based material (21) and that includes a balance spring (53, 53', 53") coaxilly mounted on a collet. According to the invention, the collet (55, 55', 55") includes one extending part (19) the projects from the balance spring and which is made in a second layer on silicon-based material (5) and is secured to the balance (43, 43', 43"). The present invention also relates to a timepiece the includes the regulating member and to the associated manufacturing method. The present invention concerns the field of timepiece movements.

The invention claimed is:

1. A one-piece regulating member including:

(a) a balance made in a first layer of silicon-based material and cooperating with a hairspring, wherein the hairspring is made in a second layer of silicon-based material and includes a balance spring coaxially mounted on a collet; and, (b) a part forming a spacer that is made in a third layer of silicon-based material and is secured between the collet and the balance in order to form the regulating member in a one piece manner.

2. The regulating member according to claim 1, wherein the balance includes a hole that extends an inner diameter of the collet so as to receive a balance staff.

3. The regulating member according to claim 2, wherein the balance staff is secured to the balance.

4. The regulating member according to claim 3, wherein the balance staff is secured to the balance by being driven against a metal coating made in said hole.

5. The regulating member according to claim 2, wherein a section of the inner diameter of the collet is larger than that of the hole of the balance to prevent push fit contact between the balance staff and the inner diameter of the collet.

6. The regulating member according to claim 1, wherein a felloe of the balance is continuous and includes an adaptation device that alters the moment of inertia of the balance.

7. The regulating member according to claim 6, wherein the felloe is connected to a hub of the balance by at least one arm, wherein the at least one arm is slim to allow axial deformation thereof, or radial deformation thereof, or both axial and radial deformation thereof, in the event of any shock transmitted to the balance.

8. The regulating member according to claim 6, wherein the adaptation device includes recesses made on the felloe of the balance so as to adjust the inertia of said balance.

9. The regulating member according to claim 8, wherein the recesses include a material of greater density than that of the felloe of the balance so as to increase the inertia of said balance.

10. The regulating member according to claim 6, wherein the adaptation device includes bosses made on the felloe of the balance and the bosses include a material of greater density than the felloe so as to increase the inertia of said balance.

11. The regulating member according to claim 7, wherein said material of larger density is distributed on the felloe in the form of a notched ring including a series of studs spaced at regular intervals to compensate for any thermal expansion of said material.

12. The regulating member according to claim 1, wherein an inner coil of the balance spring has a Grossmann curve to improve concentric development of said balance spring.

13. The regulating member according to claim 1, wherein the balance spring has at least one silicon-dioxide based part to make said balance spring more mechanically resistant and to adjust a thermo-elastic coefficient thereof.

14. A timepiece, wherein the timepiece includes a regulating member according to claim 1.

15. A method of manufacturing a one-piece regulating member, wherein the method includes the following steps:

(a) providing a substrate including a top layer and a bottom layer of silicon-based materials;

(b) selectively etching at least one cavity in the top layer to define the pattern of a first part of a collet, and to define a first part of a balance made of silicon-based materials, of the one-piece regulating member;

(c) joining by silicon fusion bonding an additional layer of silicon-based material to the etched top layer of the substrate;

(d) selectively etching at least one cavity in the additional layer to continue the pattern of the first part of the collet and the first part of the balance, and to define a pattern of a balance spring, made of silicon-based material, of one-piece regulating member;

(e) selectively etching at least one cavity in a bottom layer to define a last part of the balance made of silicon-based material, of the one-piece regulating member; and (f) releasing the one-piece regulating member from the substrate.

16. The manufacturing method according to claim 15, wherein, after step (d), the method further includes the following step:

(g) oxidising the balance spring, made of silicon-based material, of said one-piece regulating member, so as to adjust a thermo-elastic coefficient thereof and also to make said balance spring more mechanically resistant.

17. The manufacturing method according to claim 15, wherein, prior to step (e), the method further includes the following step:

(g) selectively depositing at least one metal layer on the bottom layer to define a pattern of at least one metal part of said one-piece regulating member.

18. The manufacturing method according to claim 17 wherein step (g) includes the following step:

i. growing said deposition by successive metal layers at least partially over a surface of the bottom layer so as to form a metal part for increasing the mass of the balance made of silicon based materials.

19. The manufacturing method according to claim 17, wherein step (g) includes the following phase:

ii. growing said deposition by successive metal layers at least partially over the surface of the bottom layer so as to form a metal part for receiving an arbour that is driven therein.

20. The manufacturing method according to claim 17, wherein step (g) includes the following phases:

i. selectively etching at least one cavity in the bottom layer for receiving said at least one metal part; and ii. growing said deposition by successive metal layers at least partially in said at least one cavity so as to form a metal part for increasing the mass of the balance made of silicon-based materials.

21. The manufacturing method according to claim 17, wherein step (g) includes the following phases:

i. selectively etching at least one cavity in the bottom layer for receiving said at least one metal part; and ii. growing said deposition by successive metal layers at least partially in said at least one cavity so as to form a second metal part for receiving an arbour that is driven therein.

22. The manufacturing method according to claim 17, wherein step (h) is followed by the following step:

(i) polishing the metal deposition.

23. The manufacturing method according to claim 15, wherein several regulating members are made on the same substrate.

* * * * *